United States Patent
Saigusa

(10) Patent No.: US 10,846,032 B2
(45) Date of Patent: Nov. 24, 2020

(54) INFORMATION PROCESSING APPARATUS AND METHOD OF CONTROLLING INFORMATION PROCESSING APPARATUS, WITH DISPLAY CONTROL FOR DISPLAYING PRINT SETTING SCREENS AS DATA BECOME AVAILABLE

(71) Applicant: CANON KABUSHIKI KAISHA, Tokyo (JP)

(72) Inventor: Hirokazu Saigusa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/430,551

(22) Filed: Jun. 4, 2019

(65) Prior Publication Data

US 2019/0294395 A1    Sep. 26, 2019

Related U.S. Application Data

(63) Continuation of application No. 15/764,706, filed as application No. PCT/JP2016/004674 on Oct. 24, 2016, now Pat. No. 10,353,655.

(30) Foreign Application Priority Data

Nov. 25, 2015  (JP) .................................. 2015-230044

(51) Int. Cl.
G06F 15/00 (2006.01)
G06F 3/12 (2006.01)
G06K 1/00 (2006.01)

(52) U.S. Cl.
CPC .......... G06F 3/1253 (2013.01); G06F 3/1203 (2013.01); G06F 3/1205 (2013.01);
(Continued)

(58) Field of Classification Search
CPC .... G06F 3/1253; G06F 3/1203; G06F 3/1205; G06F 3/1214; G06F 3/1232; G06F 3/1284
(Continued)

(56) References Cited

U.S. PATENT DOCUMENTS 8,860,996 B2    10/2014  Kishida
2008/0259392 A1  10/2008  Tokumoto
(Continued)

FOREIGN PATENT DOCUMENTS

CN    101770350 A    7/2010
CN    104081332 A    10/2014
(Continued)

OTHER PUBLICATIONS

International Search Report issued in Intl. Appln. No. PCT/JP2016/004674 dated Nov. 29, 2016.
(Continued)

Primary Examiner — Douglas Q Tran
(74) Attorney, Agent, or Firm — Rossi, Kimms & McDowell LLP

(57) ABSTRACT

An information processing apparatus is provided that includes a first determination unit configured to determine whether or not a print setting value specified in a print ticket exists in a database; a second determination unit configured to determine whether or not cache data exists if the first determination unit determines that the print setting value does not exist in the database; a display unit configured to display the print setting value based on the cache data if the second determination unit determines that the cache data exists, and display a print setting item of the print setting value in a particular state if the second determination unit determines that the cache data does not exist.

5 Claims, 23 Drawing Sheets

(52) U.S. Cl.
CPC .......... *G06F 3/1214* (2013.01); *G06F 3/1232* (2013.01); *G06F 3/1284* (2013.01)

(58) Field of Classification Search
USPC .............................. 358/1.15, 1.1, 1.13, 1.14
See application file for complete search history.

(56) References Cited

U.S. PATENT DOCUMENTS

| | | |
|---|---|---|
| 2012/0133984 A1 | 5/2012 | Hayakawa |
| 2012/0162713 A1* | 6/2012 | Minamiyama ........ G06F 3/1205 358/1.15 |
| 2012/0224208 A1 | 9/2012 | Tokumoto |
| 2014/0293312 A1 | 10/2014 | Fukasawa |
| 2016/0039234 A1* | 2/2016 | Hirai .................... G06F 3/1206 347/5 |
| 2016/0253132 A1 | 9/2016 | Nishida |

FOREIGN PATENT DOCUMENTS

| | | |
|---|---|---|
| CN | 104583931 A | 4/2015 |
| JP | 2012190102 A | 10/2012 |
| JP | 2013058151 A | 3/2013 |

OTHER PUBLICATIONS

Written Opinion issued in Intl. Appln. No. PCT/JP2016/004674 dated Nov. 29, 2016.
Office Action issued in U.S. Appl. No. 15/764,706 dated Sep. 6, 2018.
Notice of Allowance issued in U.S. Appl. No. 15/764,706 dated Mar. 6, 2019.
Office Action issued in Chinese Appln. No. 201680069096.4 dated Jul. 27, 2020. English translation provided.

* cited by examiner

[Fig. 1]
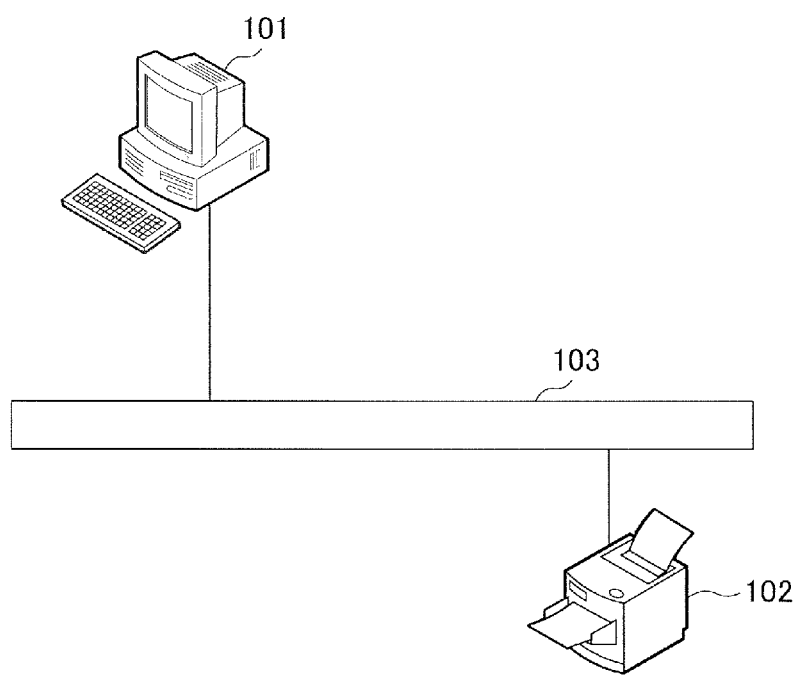

[Fig. 2]
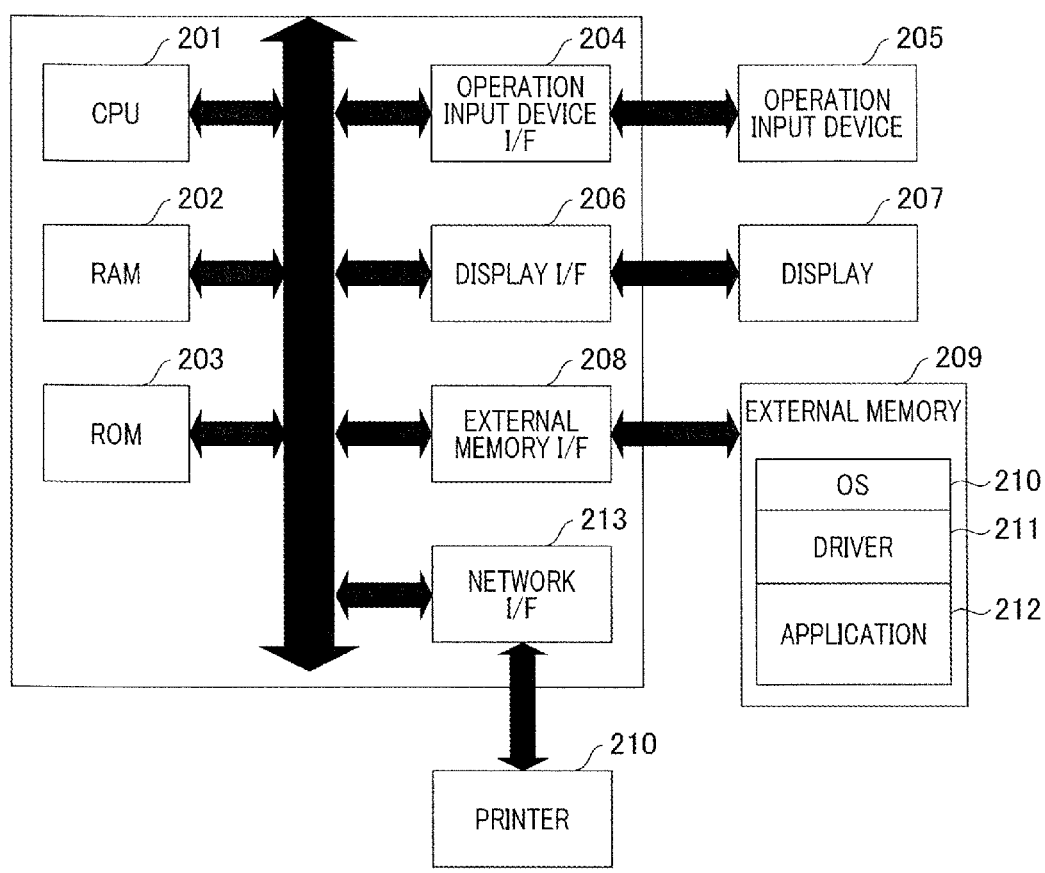

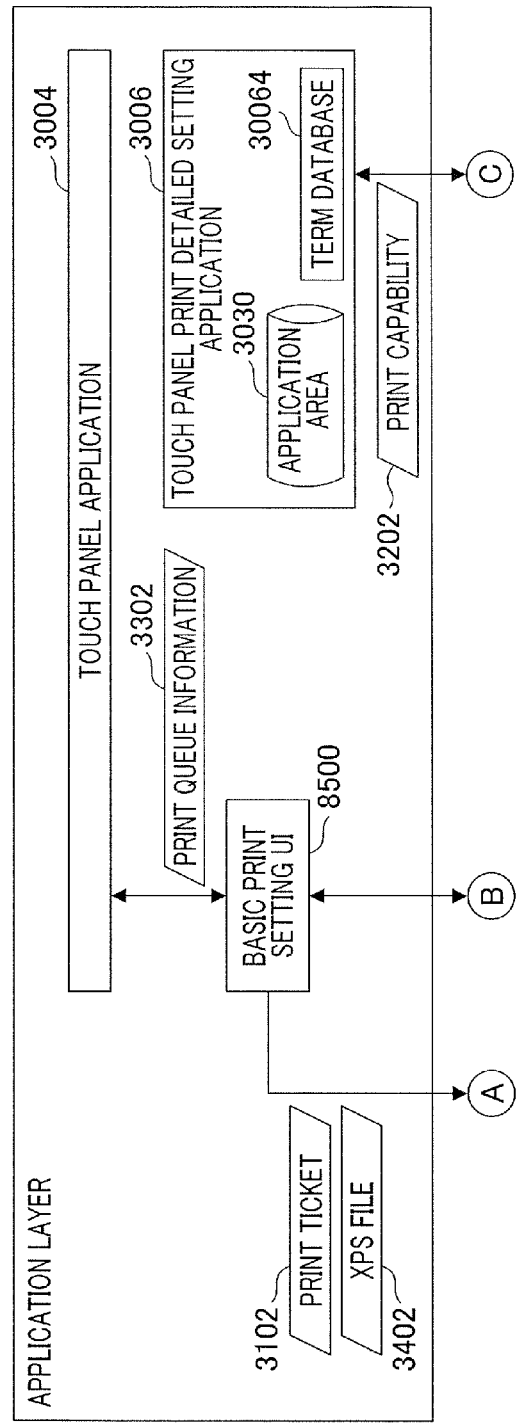
[Fig. 3]

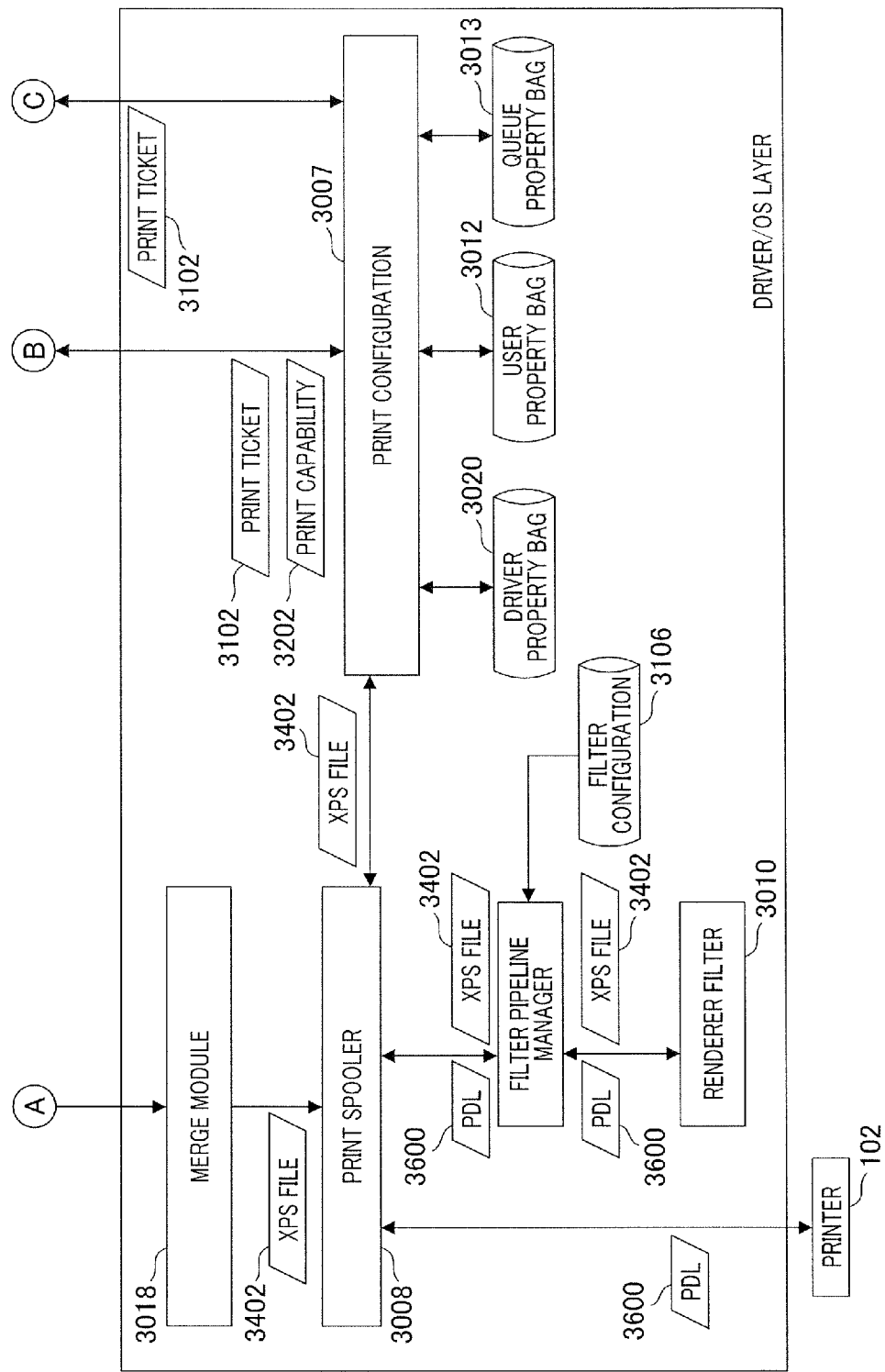
[Fig. 4]

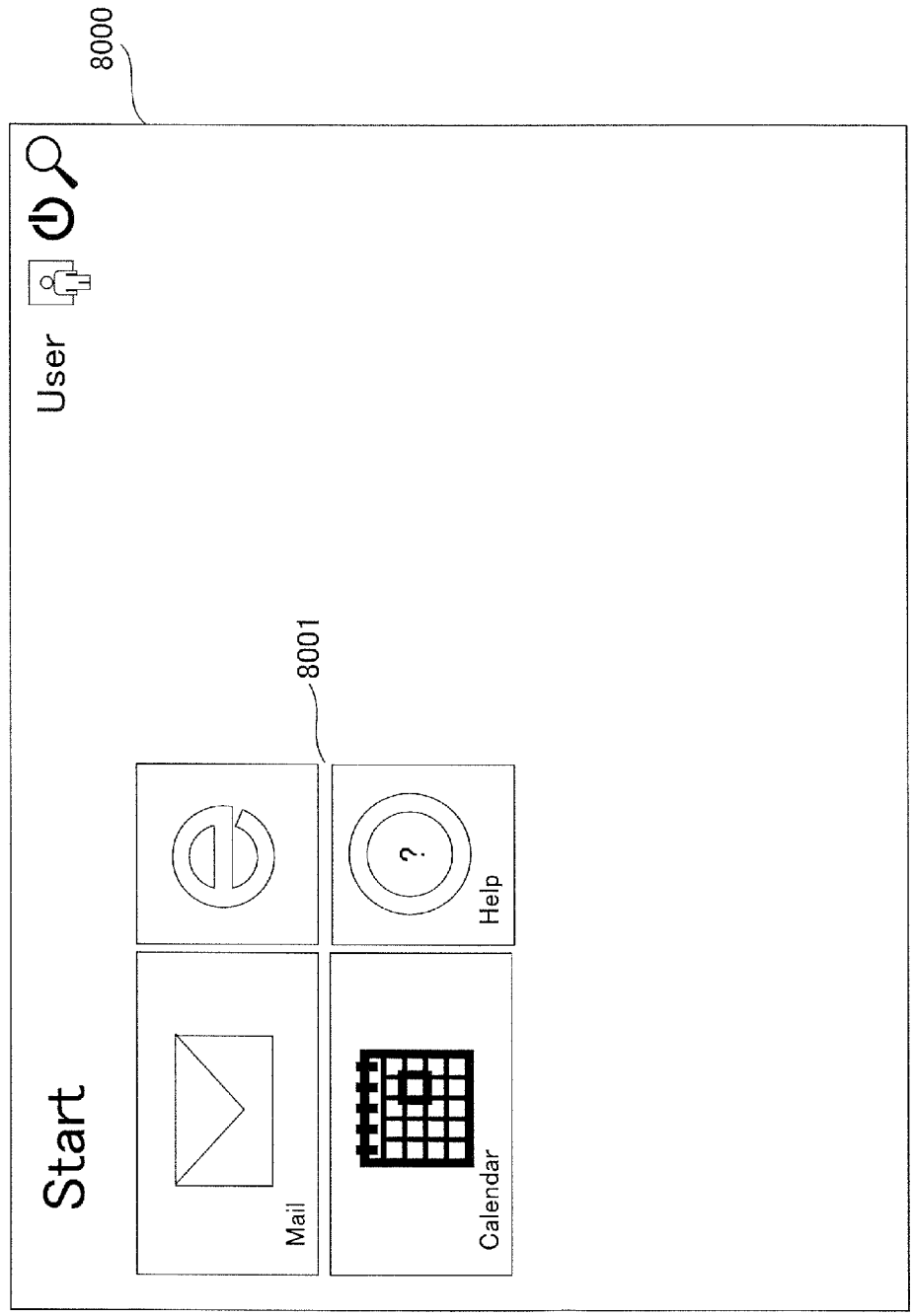

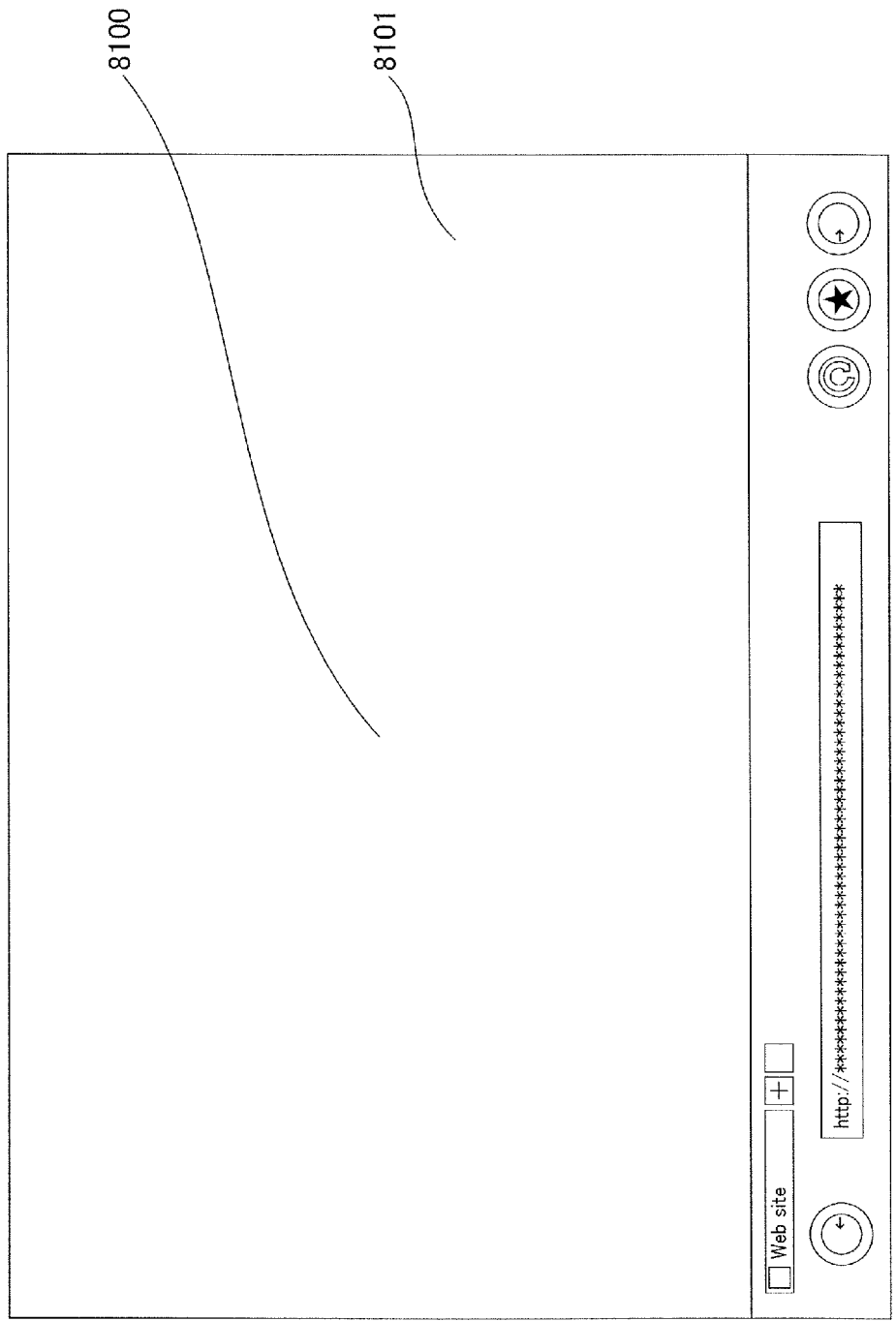
[Fig. 5B]

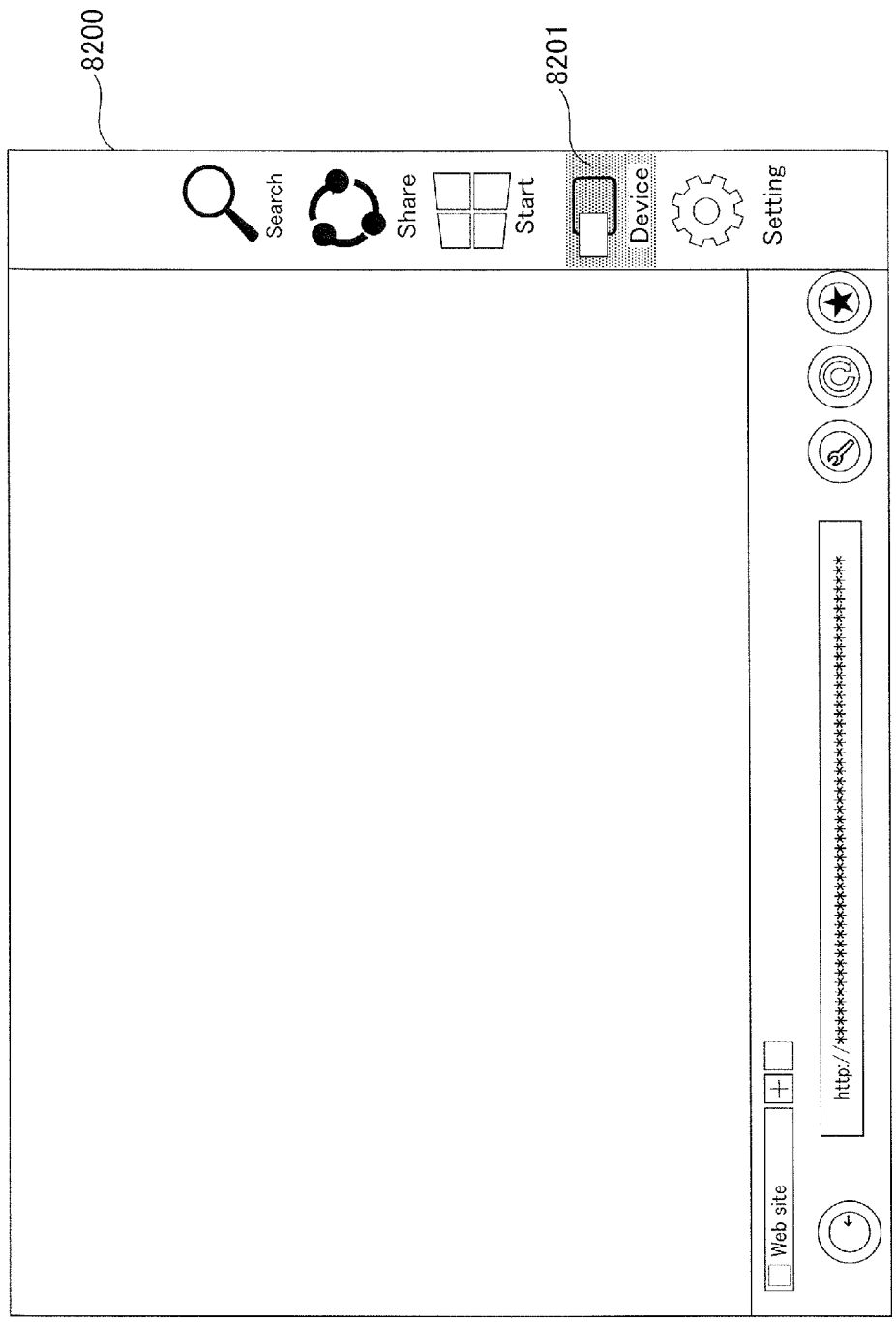
[Fig. 5C]

[Fig. 6A]
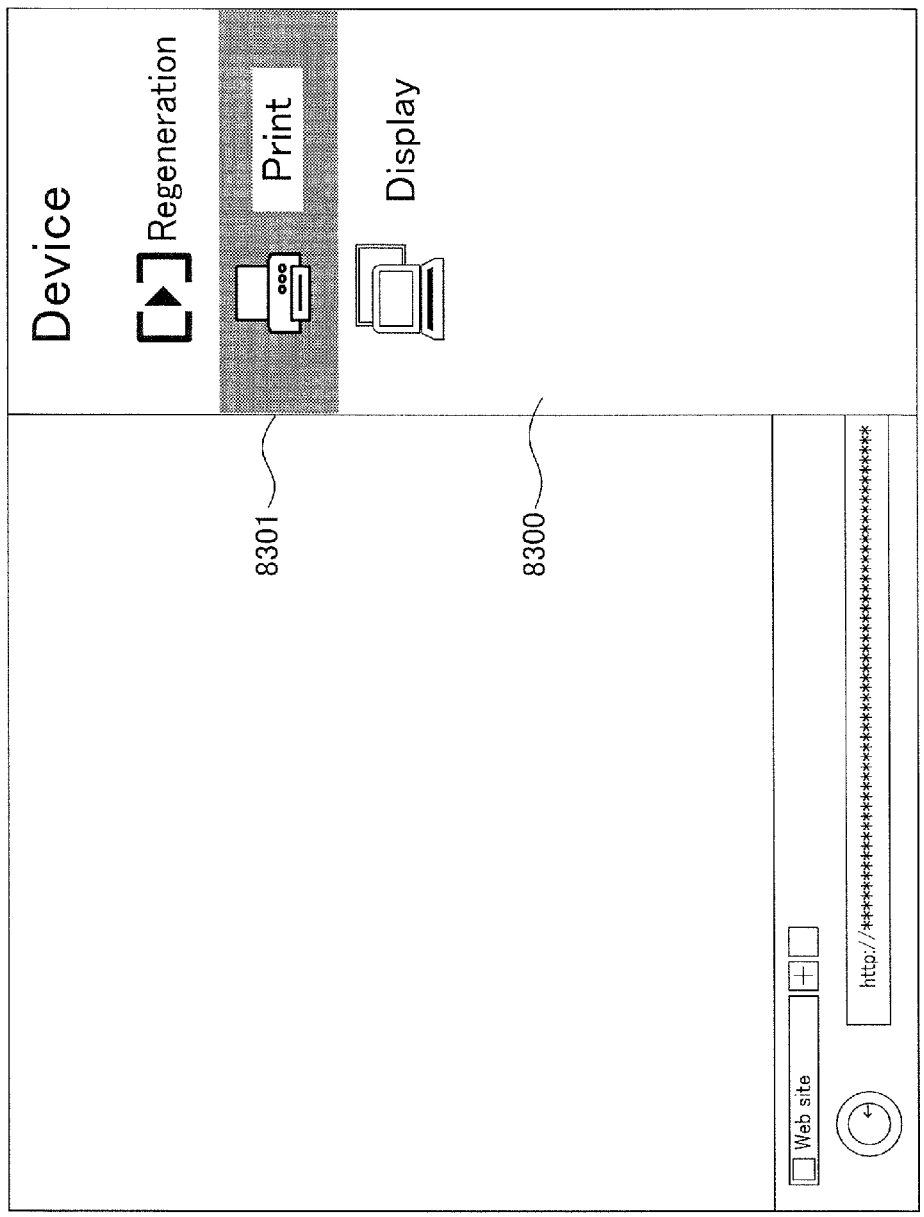

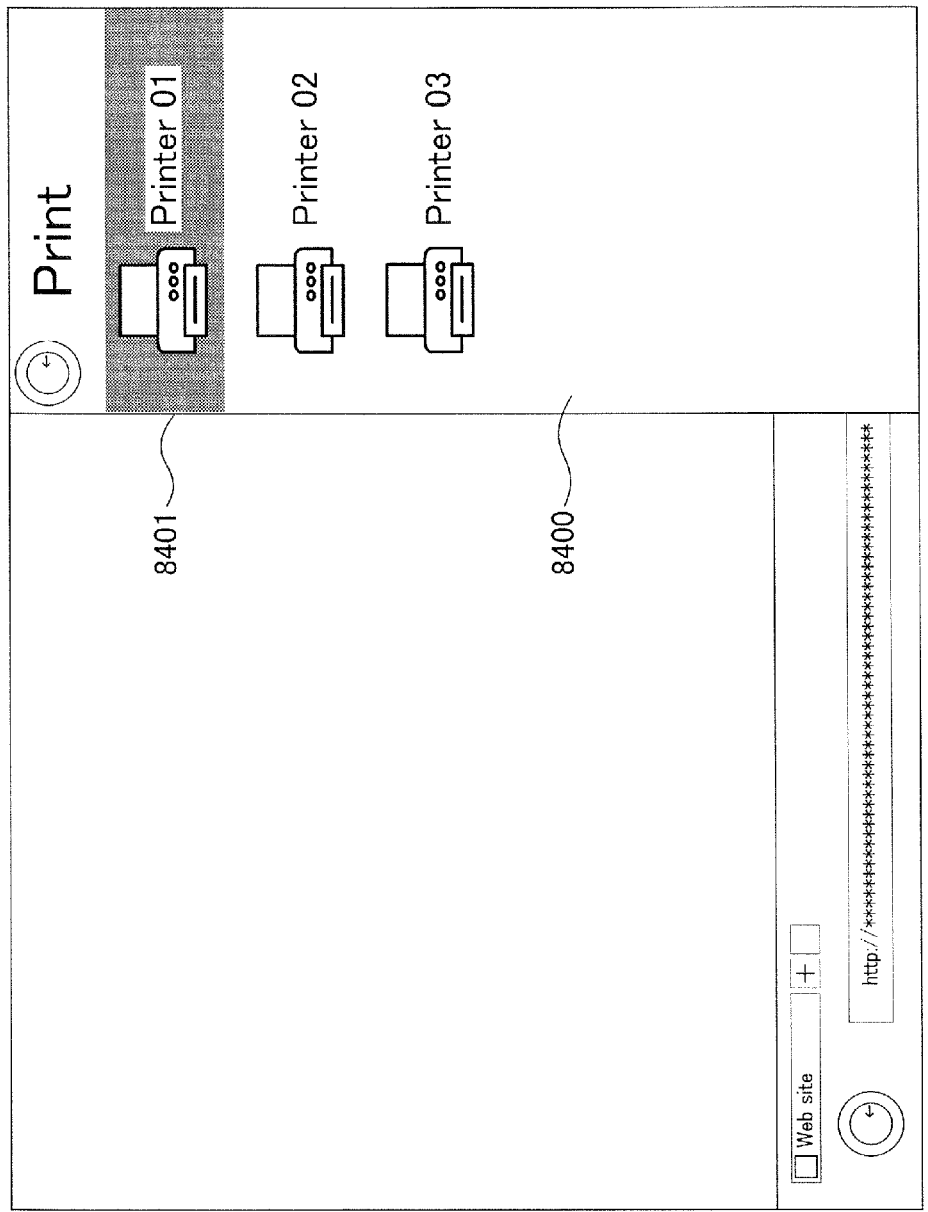
[Fig. 6B]

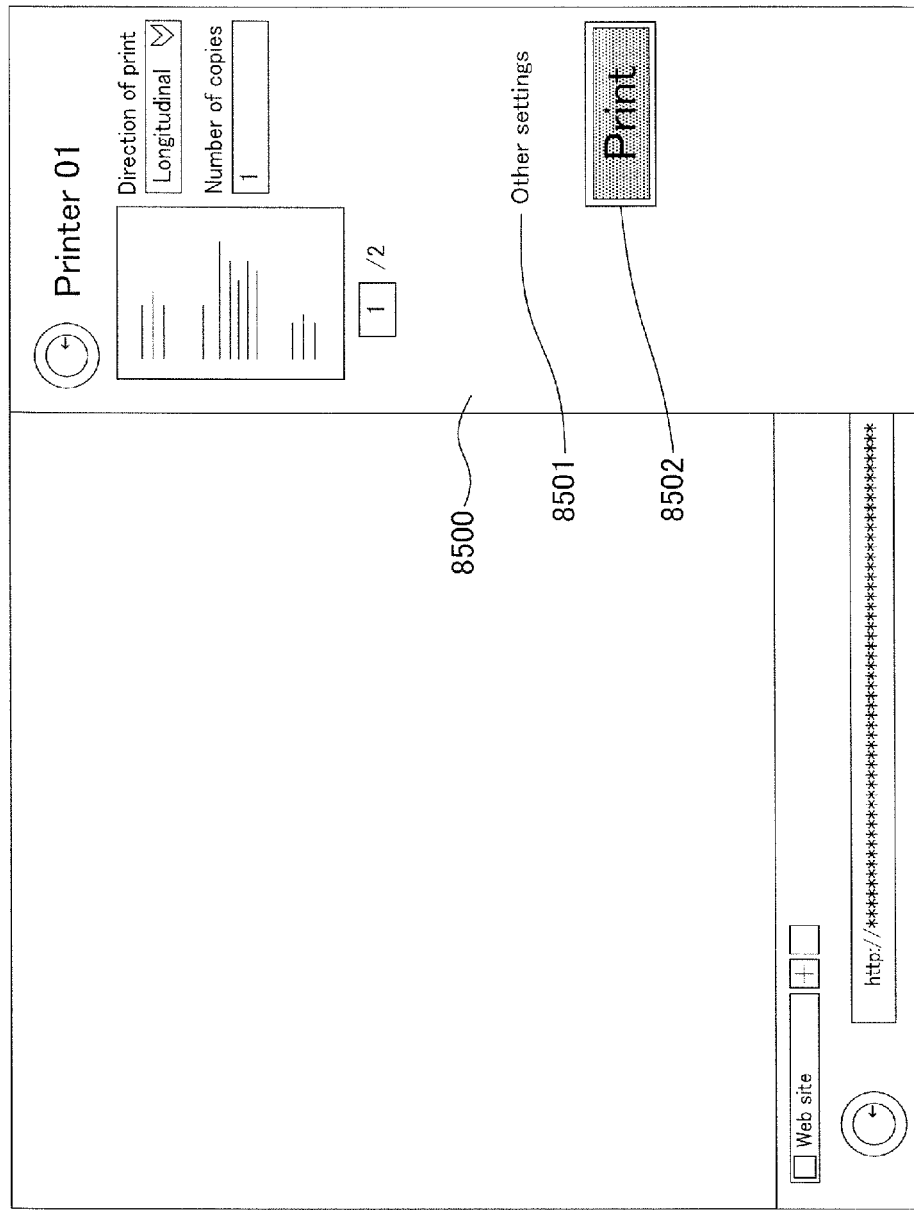

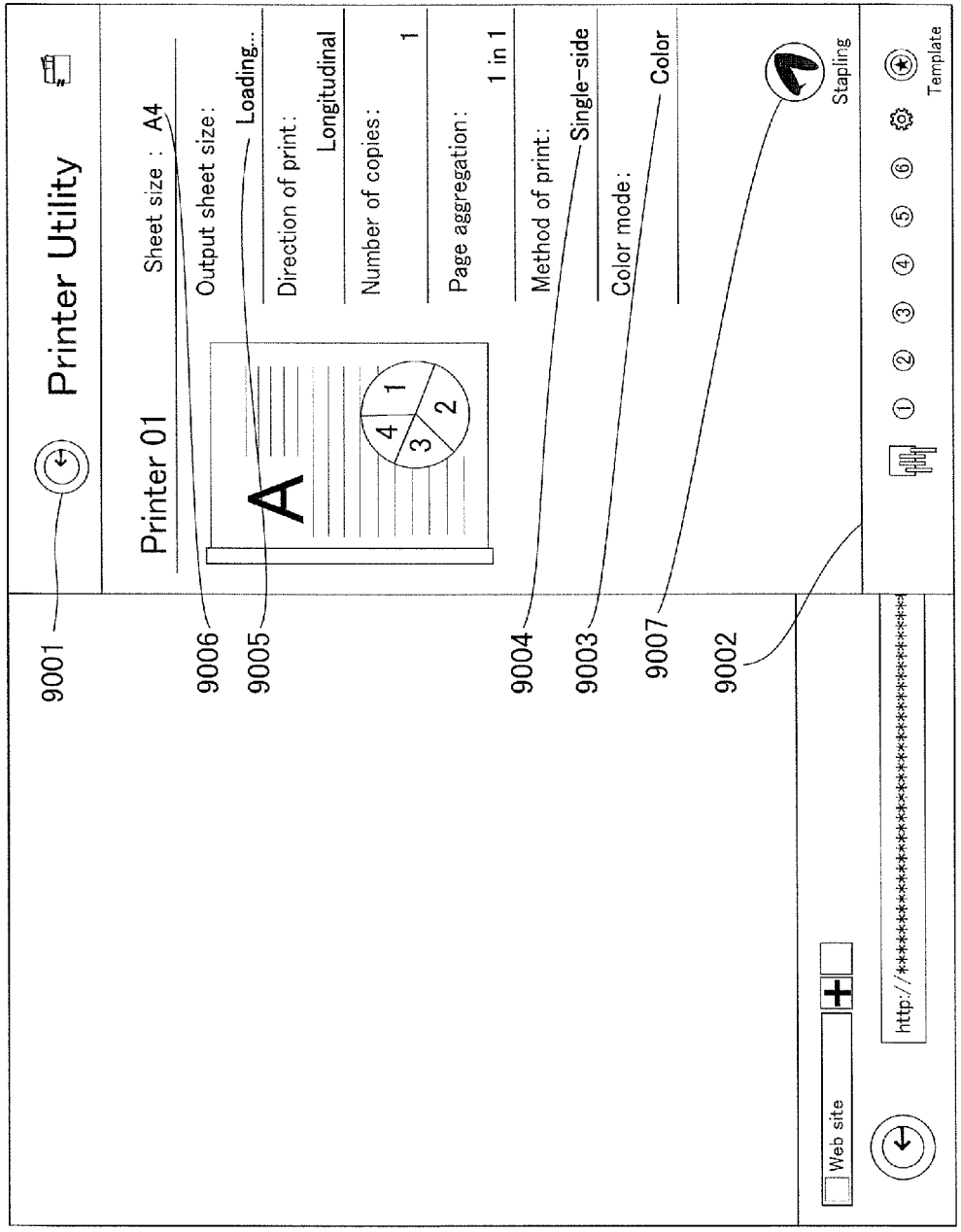
[Fig. 7A]

[Fig. 7B]

[Fig. 8]
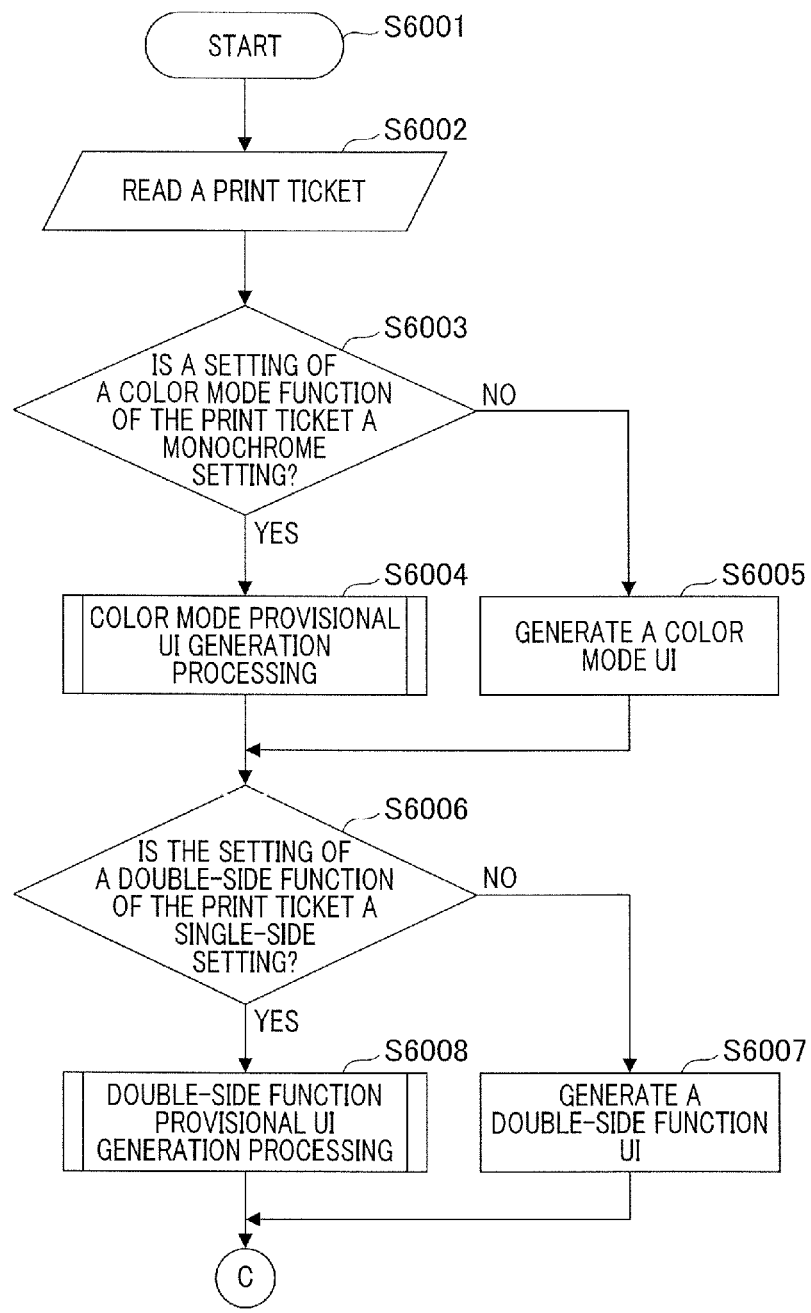

[Fig. 9]
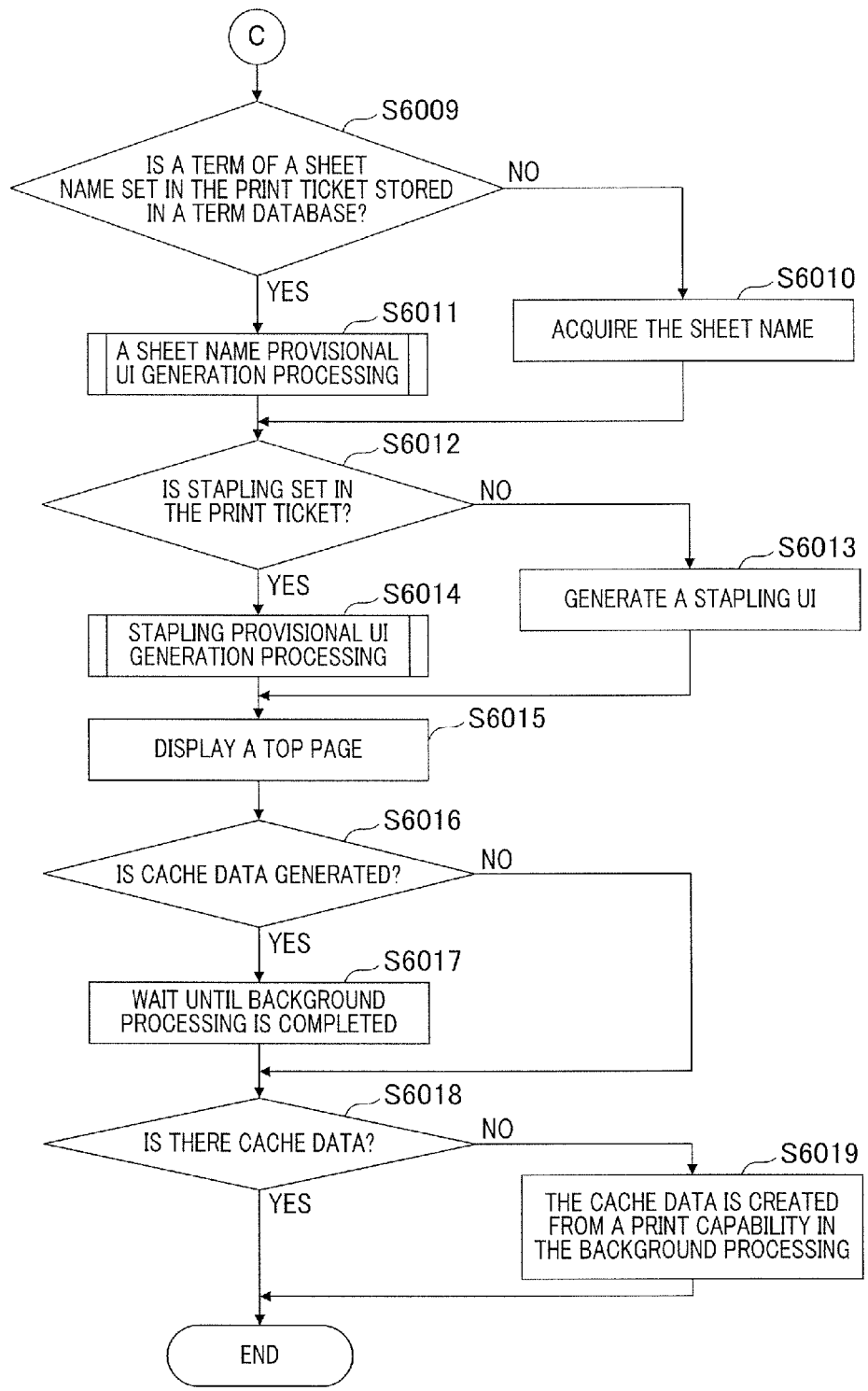

[Fig. 10A]
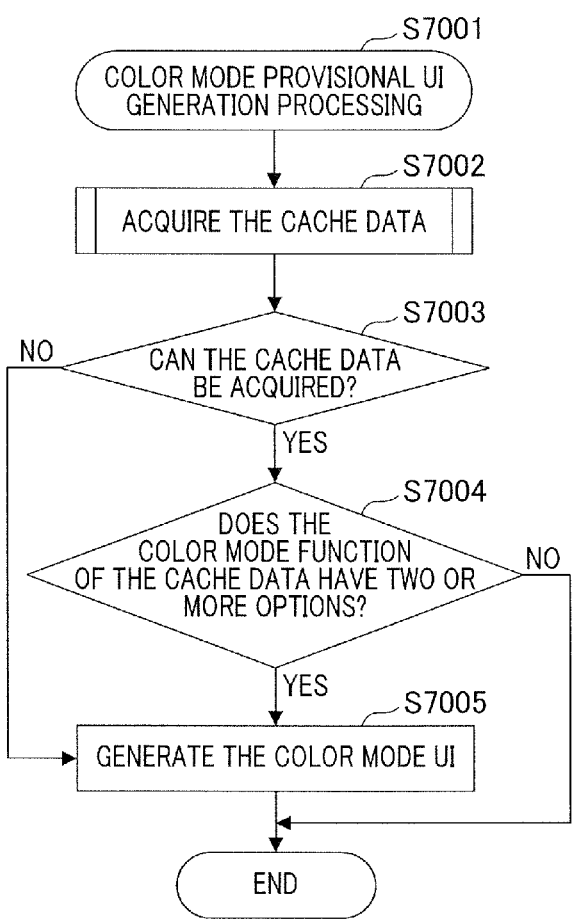

[Fig. 10B]
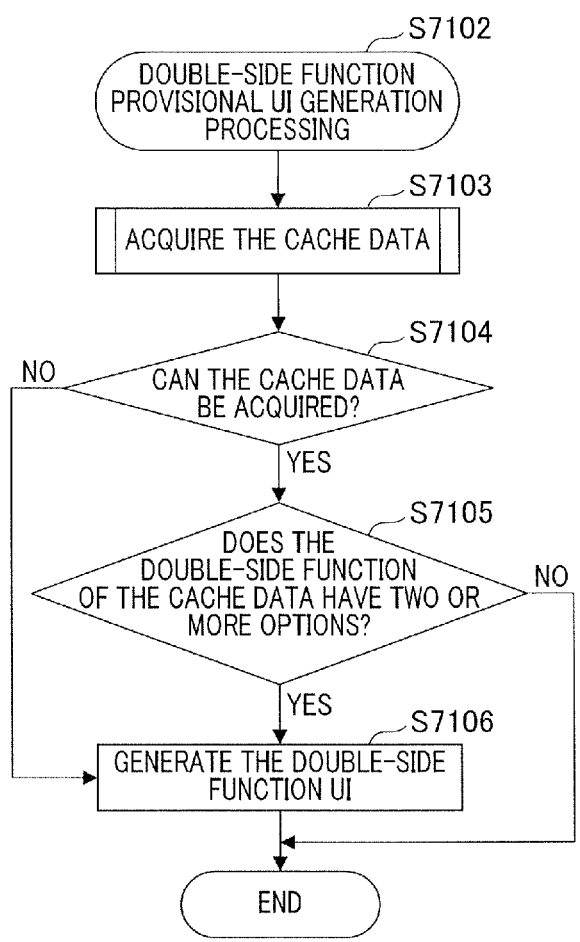

[Fig. 11A]
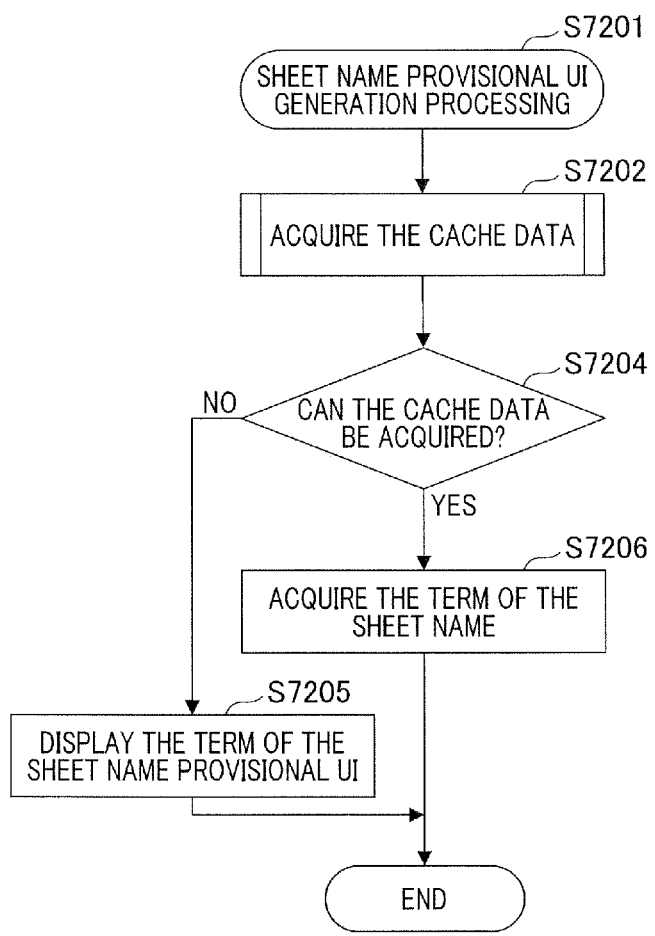

[Fig. 11B]
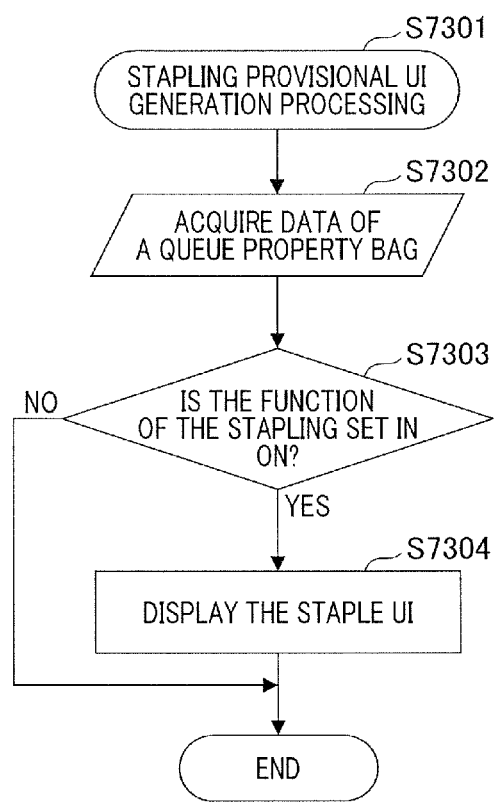

[Fig. 12]
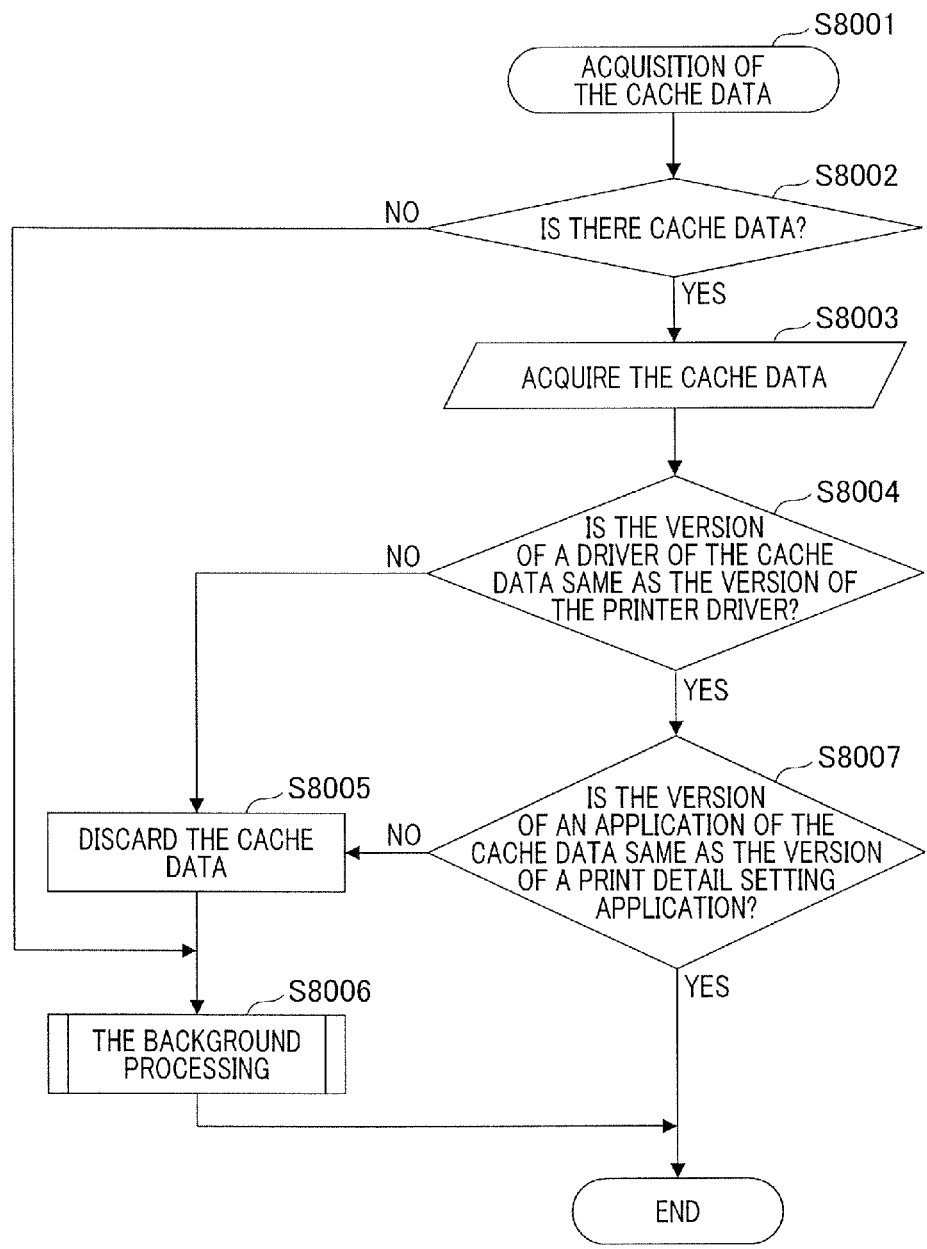

[Fig. 13]
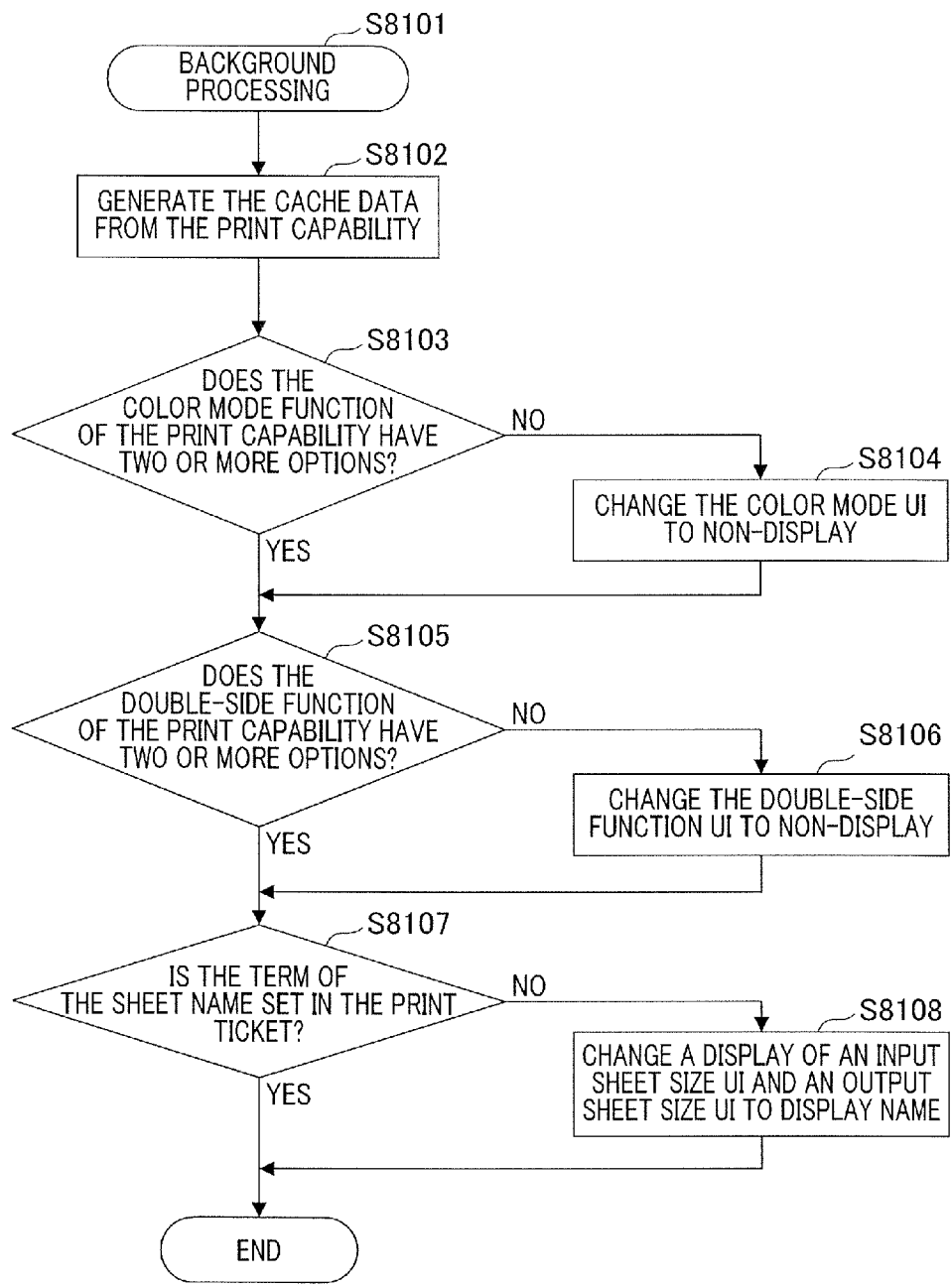

[Fig. 14A]

```xml
<psf:Feature name="psk:PageMediaSize">                                              — 12001
  <psf:Property name="psf:SelectionType">
    <psf:Value xsi:type="xsd:QName">psk:PickOne</psf:Value>
  </psf:Property>
  <psf:Property name="psk:DisplayName">
    <psf:Value xsi:type="xsd:string">Letter</psf:Value>
  </psf:Property>
  <psf:Option name="psk:NorthAmericaLetter" constrained="psk:None">   — 12002
    <psf:ScoredProperty name="psk:MediaSizeWidth">
      <psf:Value xsi:type="xsd:integer">279400</psf:Value>
    </psf:ScoredProperty>
    <psf:ScoredProperty name="psk:MediaSizeHeight">
      <psf:Value xsi:type="xsd:integer">431800</psf:Value>
    </psf:ScoredProperty>
    <psf:Property name="psk:DisplayName">
      <psf:Value xsi:type="xsd:string">Letter</psf:Value>             — 12005
    </psf:Property>
  </psf:Option>
</psf:Feature>
```

[Fig. 14B]

```
<psf:Feature name=" psk:DocumentDuplex">          —12003
    <psf:Option name=" psk:OneSided" />           —12004
</psf:Feature>
```

[Fig. 15]

| Locality | Container | Key | Value |
|---|---|---|---|
| Local | Print01 | PrintCapabilities | <psf:Feature name=" psk:PageMediaSize "> <psf:Property name=" psf:SelectionType ">... |
| Local | Print01 | ColorMode | Color |
| Local | Print01 | Duplex | Duplex |
| Local | Print01 | Letter2 | SecondLetter |
| Local | Print01 | DriverVersion | 5.0.0 |
| Local | Print01 | AppVersion | 2.0.0 |
| Roaming | Print02 | PrintCapabilities | <psf:Feature name=" psk:PageMediaSize "> <psf:Property name=" psf:SelectionType ">... |
| Roaming | Print02 | DriverVersion | 4.0.0 |
| Roaming | Print02 | AppVersion | 1.0.0 |

US 10,846,032 B2

INFORMATION PROCESSING APPARATUS AND METHOD OF CONTROLLING INFORMATION PROCESSING APPARATUS, WITH DISPLAY CONTROL FOR DISPLAYING PRINT SETTING SCREENS AS DATA BECOME AVAILABLE

TECHNICAL FIELD

The invention relates to an information processing apparatus, a controlling method of the information processing apparatus, and a storage medium.

BACKGROUND ART

A print setting UI (User Interface) of a V4 driver is formed by print setting information (print ticket) configured by a user operation and print settings list information that is a list of features held by the driver (print capability). In the print setting UI of the V4 driver, there is a case that a plurality of different types of V4 driver is supported by one print setting UI. In this case, in order to display a suitable UI for each V4 driver, it is necessary to change the UI displayed by using model-specific information of the driver, including a print capability. Patent Literature 1 discloses a method in which a model-specific print setting UI is formed by using function information acquired from a print server.

CITATION LIST

Patent Literature

Patent Literature 1: Japanese Patent Laid-Open No. 2013-58151

If an information amount of the print capability is large, it takes time to analyze, and thus, the print setting UI is created and displayed in advance by only a relatively small amount of an information printed ticket, and the operation is received after performing a syntax analysis of print capability in the background. For example, a color mode UI which is a controller for switching between color and monochrome is unnecessary because there is no option other than the monochrome in a monochrome device. In this case, on the print setting UI, it is necessary to display the color mode UI in only a color device and to disable hiding and graying out in the monochrome device. However, a determination of the color device and the monochrome device must be determined by the number of the options of the color mode function in the print capability, and not be determined by only the print ticket.

SUMMARY OF INVENTION

The present invention provides an information processing apparatus that can display the print setting UI by only the print ticket even if it is a UI with an uncertain display form, in the case where the print setting UI is created and displayed from the print ticket (print setting information).

An information processing apparatus is provided that includes a first determination unit configured to determine whether or not a print setting value specified in a print ticket exists in a database; a second determination unit configured to determine whether or not cache data exists if the first determination unit determines that the print setting value does not exist in the database; a display unit configured to display the print setting value based on the cache data if the second determination unit determines that the cache data exists, and display a print setting item of the print setting value in a particular state if the second determination unit determines that the cache data does not exist.

According to the preset invention, an information processing apparatus can be provided that can display the print setting UI by only the print ticket even if it is a UI with an uncertain display form, in the case where the print setting UI (screen) is created and displayed from the print ticket. Therefore, a formal print setting UI can be displayed from the beginning when displaying the UI again, the display completion of the UI is completed in a very short time, and thus, a stress-free environment can be realized.

Further features of the invention will become apparent from the following description of exemplary embodiments with reference to the attached drawings.

BRIEF DESCRIPTION OF DRAWINGS

FIG. 1 is a diagram illustrating a system configuration.
FIG. 2 is a diagram illustrating a hardware configuration of a client computer.
FIG. 3 is a diagram illustrating the configuration of an application and a driver.
FIG. 4 is a diagram illustrating the configuration of the application and the driver.
FIG. 5A is a diagram illustrating a screen transition of touch panel application.
FIG. 5B is a diagram illustrating a screen transition of touch panel application.
FIG. 5C is a diagram illustrating a screen transition of touch panel application.
FIG. 6A is a diagram illustrating a screen transition of touch panel application.
FIG. 6B is a diagram illustrating a screen transition of touch panel application.
FIG. 6C is a diagram illustrating a screen transition of touch panel application.
FIG. 7A is a diagram a screen of a touch panel print setting application.
FIG. 7B is a diagram a screen of a touch panel print setting application.
FIG. 8 is a flow chart of the touch panel print setting application.
FIG. 9 is a flow chart of the touch panel print setting application.
FIG. 10A is a flow chart illustrating provisional UI creation processing.
FIG. 10B is a flow chart illustrating provisional UI creation processing.
FIG. 11A is a flow chart illustrating provisional UI creation processing.
FIG. 11B is a flow chart illustrating provisional UI creation processing.
FIG. 12 is a flow chart illustrating acquisition processing of cache data.
FIG. 13 is a flow chart illustrating background processing.
FIG. 14A is a diagram illustrating examples of a print capability and the print ticket.
FIG. 14B is a diagram illustrating examples of a print capability and the print ticket.
FIG. 15 is a diagram illustrating an example of the cache data.

DESCRIPTION OF EMBODIMENTS

Hereinafter, each embodiment will be described with reference to accompanying drawings.

First Embodiment

A description will be given of an outline of a system configuration according to the present embodiment with reference to FIG. 1. The system comprises a client computer 101 that is an example of an information processing apparatus, and a printer 102 that can receive and perform printing print data in a page description language (PDL) format. They are communicatively connected via a network 103 represented by a local area network (LAN), and the network 103 is communicatively connected to an external network. Note that, the printer 102 may be a single-function printer having only a printing function, and may be a multifunction printer having the printing function, a scanning function, a copying function, and the like.

FIG. 2 is a block diagram illustrating a hardware configuration of the client computer 101 of FIG. 1. In the client computer 101, a central processing unit (CPU) controls each device connected to system bus in accordance with program stored in a random access memory (RAM 202). Note that, the client computer 101 is assumed to comprise at least one CPU 201. In addition, the CPU 201 performs the processing based on the program stored in the external memory 209 to thereby realize a software configuration of the client computer 101 as shown below in FIGS. 3 and 4 and the processing of each step of flow chart as described below.

The RAM 202 functions as the main memory of the CPU201, a work area and the like. Various programs such as a boot program, a basic input output system (BIOS) and the like are written in a read only memory (ROM) 203. An operation input device interface (I/F) 204 is an interface for controlling an operation input device 205 such as a keyboard, a pointing device (mouse), touch UI (User Interface), and the like. A display I F 206 controls the display on the screen of a display 207. An external memory I/F 208 controls access to an external memory 209 such as, for example, a hard disk (HD), a Solid State Disk (SSD) and the like. The external memory 209 stores various applications 212 corresponding to each of an operating system program (OS) 210, a touch panel, and desktop, a driver 211 including a printer driver, various types of files, and the like. The external memory 209 functions as a readable storage medium of the computer. A network I/F 213 is connected to the printer 102 via the network 103, and performs communication control processing with the printer 102.

A description will be given with reference to FIGS. 3 and 4 of a configuration of an application and a driver configured to operate in the OS 210. In the present embodiment, the configuration is divided into an application layer, which is directly operated by the user, and a driver/OS layer, which is controlled by the OS 210 in response to a request from the application. Each application and module is stored in the external memory 209, loaded into the RAM202 as needed, and executed by the CPU 201 on the client computer 101. A processing related to the printing performed in the OS210 is divided into a print instruction performed on the touch panel and the printing processing of the driver/OS layer. Firstly, a description will be given of the software configuration in the print instruction performed on the touch panel.

Each touch panel application 3004 includes a basic print setting UI 8500, which is a basic UI for printing. Furthermore, the touch panel application 3004 acquires print queue information 3302 in response to a user request from the OS 210, and displays the print setting UI 8500 associated with the print queue information 3302. The print queue information 3302 is information for each print queue including an installed print queue name and the like. The print setting UI 8500 is a simple print setting UI that the OS 210 creates and displays based on a print capability 3202 and a print ticket 3102. The print ticket (print setting information) 3102 is print setting information that has been set. The print capability 3202 is a list information of the print setting that has been set by the driver 211. Note that, the print capability 3202 and the print ticket 3102 are described in a format that manages information in which items are separated with a tag called XML (Extensive Markup Language).

A touch panel print detailed setting application 3006 is activated in response to the user request from the basic print setting UI 8500 and functions as a display control unit. Furthermore, the touch panel print detailed setting application 3006 is invoked as a function capable of performing a detailed print setting if the touch panel print detailed setting application 3006 is invoked and activated when another application performs the printing. Note that the touch panel print detailed setting application 3006 is invoked as a tile application function if the touch panel print detailed setting application 3006 is invoked by selecting the tile on a start screen by the user. In the present embodiment, the touch panel print detailed setting application 3006 is invoked as the function capable of performing the detailed print setting, and the display of the list of the function of the various drivers 211 and the change of the detailed print setting are performed by the touch panel application 3004. The touch panel print detailed setting application 3006 can input/output local data to a user property bag 3012, an application data area 3030, and a queue property bag 3013. In addition, each of the touch panel print detailed setting application 3006 and the touch panel application 3004 includes local version information therein.

A driver property bag 3020 is a storage area in which the information for each printer driver, including the version information of the printer driver. A user property bag 3012 is a storage area of the touch panel print detailed setting application 3006 and stores the setting information of the user in the print settings and the like. Also, an application data area 3030 is the storage area of the touch panel print detailed setting application 3006 and manages the information of the touch panel print detailed setting application 3006 and the like. A queue property bag 3013 is an area for storing the device setting information including the setting information set by anadministrator of the OS 210 and finisher information for stapling.

The touch panel print detailed setting application 3006 requests the OS 210 for a print ticket 3102 and a print capability 3202. A configuration of the print capability 3202 and the print ticket 3102 will be described later. The touch panel print detailed setting application 3006 creates the UI based on the print capability 3202, the print ticket 3102, and a term database 30064, and receives the user operation. The term database 30064 is a database in which the term displayed on the touch panel print detailed setting application 3006 is registered.

After the reception completion, the touch panel print detailed setting application 3006 establishes the print setting and transmits the print ticket 3102, which is the established print setting, to the OS 210. The basic print setting UI 8500 receives a print event due to a user operation and transmits the print ticket 3102 and a XPS (XML Paper Specification) file 3402 to be printed to a merge module 3018. Note that, the XPS file is a document file described in the XML format.

Next, a description will be given of a software component in the print processing in the driver/OS layer. In the print processing, the processing for receiving the XPS file 3402 and the print ticket 3102 from the touch panel application 3004, generating the PDL 3600, and transmitting the PDL 3600 to the printer 102 is performed. The merge module 3018 that receives the print ticket 3102 and the XPS file 3402 from the touch panel application 3004 combines the print ticket 3102 with the XPS file 3402 to generate the XPS file 3402 to be printed. The merge module 3018 performs the combination by adding the print ticket 3102, which is the print setting to the XPS file 3402. The merge module 3018 transmits the XPS file 3402 to a print spooler 3008.

The print spooler 3008 resolves a conflict by transmitting the XPS file 3402 to a print configuration 3007. The print spooler 3008 acquires the XPS file 3402 on which the processing for dissolving the conflict has been performed from the print configuration 3007. The print spooler 3008 transmits the XPS file 3402 to a filter pipeline manager 3009. The filter pipeline manager 3009 is a module that undertakes invoking the module called "filter", and generates the PDL 3600 from the XPS file 3402 via the filter. The configuration of the filter to be invoked by the filter pipeline manager 3009 is described in the XML format, and the required filter is invoked in accordance with the description. Note that in the present embodiment, as one example, a renderer filter 3010 is invoked. The print spooler 3008 acquires the PDL 3600 from the filter pipeline manager 3009, and the print processing is performed by transmitting the PDL 3600 to the printer 102.

Next, a description will be given of a basic flow of the printing from the touch panel UI and the touch panel UI operated in OS 210 with reference to FIGS. 5A to 5C and 6A to 6C. The touch panel application 3004 has a UI design that emphasizes the operation of the touch display. The touch panel application 3004 is configured with a large button so as to be easily operated with the touch of a finger, a pen, and the like. Although the touch panel application 3004 accepts the operation input of the mouse or the keyboard, a description will be given assuming that the touch operation is performed.

FIG. 5A is a diagram illustrating a start screen 8000, which is an OS screen for activating the touch panel application 3004. The start screen 8000 is displayed on the entire surface of the touch display. The touch panel application 3004 is displayed on the start screen 8000 in the format of a tile 8001. If the user taps the tile 8001, the touch panel application 3004 corresponding to the tapped tile 8001 is displayed on the entire surface of the touch display.

FIG. 5B is a diagram illustrating a display example of a WEB browser 8100. The WEB browser 8100 is displayed on the entire surface of the touch display, and no other application is displayed. If the printing is performed on the touch panel application 3004, the right end on a touch display 8101 is touched, the finger is slid to the left, and a menu screen, which is a charm 8200 of FIG. 5C, is opened to thereby begin the printing. There is a plurality of options in the charm 8200, a device menu button 8201, which is the list of the menu associated with the device among the options, is tapped to thereby open a device menu 8300.

FIG. 6A is a diagram illustrating an example of the device menu 8300. In the present embodiment, there is the plurality of options such as a reproduction, the printing, and the displaying in the device menu, and a printing 8301 is tapped among the options to thereby display a print queue selection menu 8400 for selecting a print queue of a print output destination shown in FIG. 6B. Candidates for the print output destination are listed in the print queue selection menu 8400. If a "printer 01" 8401, which is one of the candidates of the print output destination, is tapped, the basic print setting UI 8500 provided by the OS 210 shown in FIG. 6C is displayed. Basic print setting information, such as the number of copies and color mode, can be set by the basic print setting UI 8500. If the basic print setting UI 8500 is depressed, the touch panel print detailed setting application 3006 is activated and the user can perform more detailed settings that are not in the basic settings. This will be described in detail below. After completing the setting, the PDL 3600 is generated by the user tapping a print button 8502, and the printing is performed.

Figure 7B:
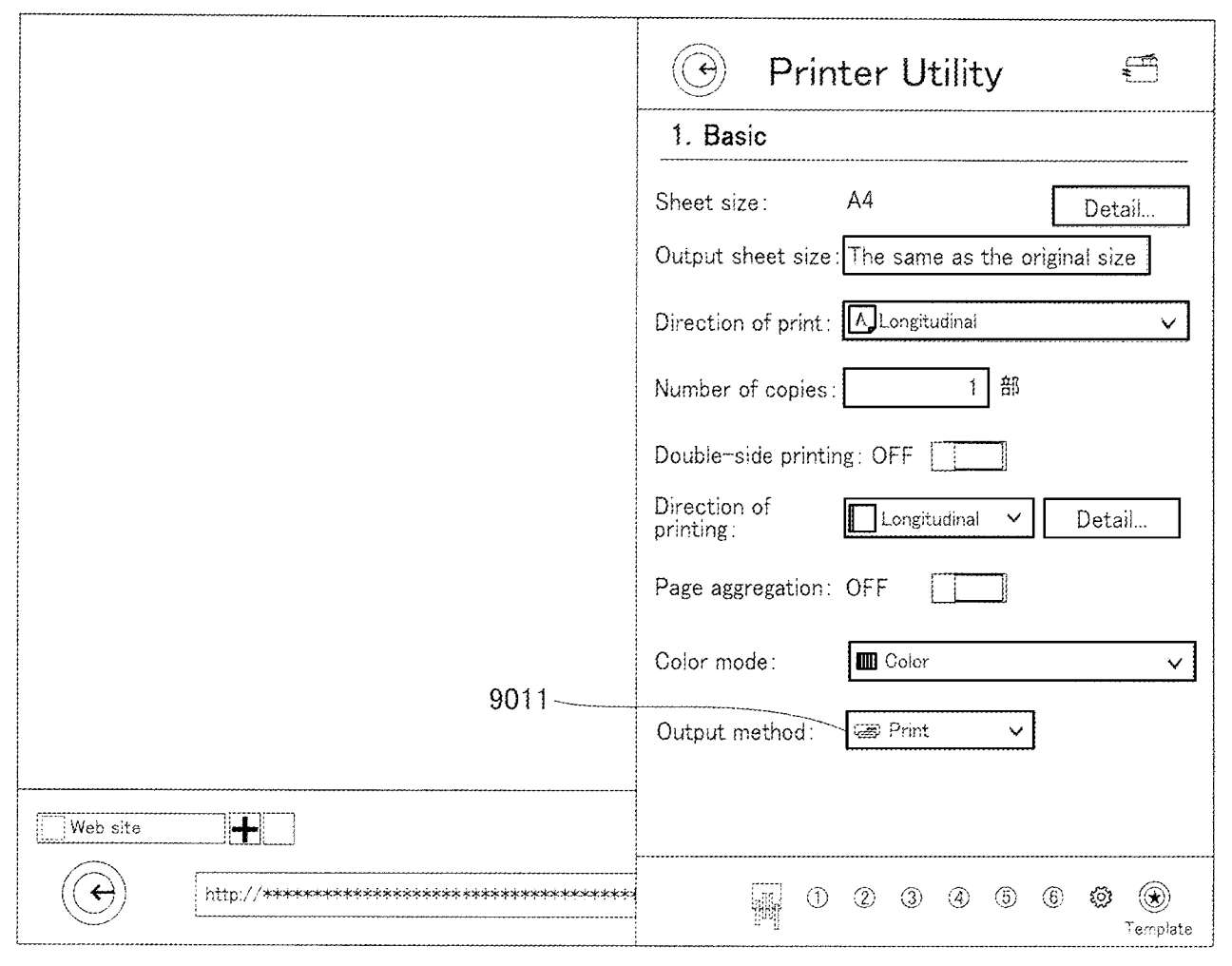

Next, a description will be given of an outline of the touch panel print detailed setting application 3006 with reference to FIGS. 7A and 7B. The touch panel print detailed setting application 3006 that is the subject of the present embodiment includes a top page screen shown FIG. 7A and a full-function setting screen shown in FIG. 7B. The top page screen is a screen including a basic function of the driver, and the full-function setting screen is a screen including a more detailed setting function. These two print setting screens can be moved by sliding the finger to the left and right on the screen. The full-function setting screen is configured of a plurality of sheets by the control called a flip view. In the flip view, a page can be transition to an adjacent page by the user sliding the finger to the left and right. Furthermore, a page dot 9002 is displayed over the entire lower region of the top page screen and the full-function setting screen in the touch panel print detailed setting application 3006. The page dot 9002 is displayed by the number of pages, and the page number is displayed on each page dot 9002. The user taps the page dot 9002, and it is thereby possible to transition to the sheet the corresponding page number at one time.

FIG. 7A illustrates a color mode UI 9003 for setting either color or monochrome for the color mode. A double-side function UI 9004 is a control UI for selecting either a double-side or single-side for the double-side function.

In the present embodiment, a provisional term is displayed that is used when the term of the corresponding sheet is not stored in a term database 30064. An input sheet size UI 9006 is the control UI for selecting an input sheet size. In the present embodiment, an A4 sheet is selected. A staple UI 9007 is a UI indicating that there is a staple function.

A button 9001 is a back button, and is tapped when the user establishes the print setting and ends the touch panel print detailed setting application 3006. FIG. 7B illustrates an output method 9011, which is an item capable of setting the option such as secure print, as one example. In the present embodiment, "the printing" indicating the normal printing is set.

Next, a description will be given of a basic flow for activating the touch panel print detailed setting application 3006 by using flow charts in FIGS. 8 and 9. Note that, unless otherwise specified, a subject of the flow chart is the touch panel print detailed setting application 3006. Furthermore, each sub-process will be described below with reference to FIGS. 10A to 13.

Firstly, the touch panel print detailed setting application 3006 is loaded from the external memory 209 to the RAM 202 in response to the request of the other system and the user and performed in the CPU 201, and then the processing is started (step S6001). Next, the touch panel print detailed setting application 3006 reads the print ticket 3102 (step S6002).

Next, it is determined whether or not the setting of a color mode function of the print ticket 3102 is set to monochrome (step S6003). Here, the color mode function is the function for switching between color printing and monochrome printing. If the device is a device that can perform color printing (a color machine), the device can switch between color printing and monochrome printing, and if the device is a device that performs only monochrome printing (a monochrome machine), monochrome printing is fixed. Next, if the color is set in the color mode function of the print ticket 3102 (No), the color mode UI 9003 for changing the color mode is created (step S6005). That is, it is determined that there are two or more options of color and monochrome, and the color mode UI 9003 is created. In contrast, if the monochrome is set in the color mode function of the print ticket 3102 (Yes), color mode UI provisional creation processing is performed because it cannot be determined whether the set print queue is the color machine or the monochrome machine.

Next, the setting of the double-side function of the print ticket 3102 is confirmed (step S6006). That is, it is determined whether or not the setting of the double-side function of the print ticket 3102 is a single-side setting. In this context, a double-side function is a function for switching between double-side printing and single-side printing. The device that can perform double-side printing (a double-side machine) can switch between double-side printing and single-side printing, and the device that can perform only the single-side printing (a single-side machine) is fixed to the single-side printing.

If the double-side is set in the double-side function of the print ticket 3102 (No), it is determined that there are two or more options of the double-side and the single-side and a double-side function UI 9004 is created (step S6007). In contrast, the single-side is set in the double-side function of the print ticket 3102 (Yes), it cannot be determined whether it is the single-side machine or the double-side machine. If it is the single-side machine, the double-side function is not necessary because there is only one option, and if it is the double-side machine, the double-side function UI 9004 is necessary because there are two or more options. Thus, if the single-side is set, a double-side function provisional UI creation processing is performed (step S6008).

Next, it is determined whether or not the term for the input sheet size and the output sheet size, which are set in the print ticket 3102, is stored in the term database 30064 (step S6009). If the term for the sheet size set in the print ticket 3102 is not stored in the term database 30064 (Yes), a sheet name provisional creation processing is performed (step S6011). In contrast, if the term for the sheet size set in the print ticket 3102 is stored in the term database 30064 (No), the term corresponding to the sheet is acquired and displayed on an input sheet size UI 9006 and an output sheet size UI 9005 (step S6010).

Next, it is determined whether or not stapling is set in in the print ticket 3102 (step S6012). If stapling is set (No), a stapling UI 9007 is created (step S6013). In contrast, if stapling is not set (Yes), a stapling provisional UI creation processing is created (step S6014).

Next, the top page shown in FIGS. 5A to 5C is displayed (step S6015). After displaying the top page, it is determined whether or not the creation of the cache data is performed in the background (step S6016). Here, the cache data is information about the print capability 3202 stored in the application data area 3030 functioning as a storing unit if the touch panel print detailed setting application 3006 has been activated. Note that the creation of the cache data will be described below in FIGS. 12 and 13.

If the cache data is created (Yes), it waits until the background processing is completed (step S6017). Note that, the background processing will be described below in FIGS. 10A, 10B, 11A, and 11B. If the cache data is not created (No), or after waiting until the background processing is completed, it is determined whether or not the cache data is presented in the application data area 3030 (step S6018). If the cache data is not presented in the application data area 3030 (No), the cache data is created so as to refer to the cache on or after startup (step S6019). If the cache data is presented in the application data area 3030 (Yes), the cache data is created and then the processing ends.

A description will be given of the sub-processing of the flow chart of FIGS. 8 and 9 with reference to the flow chart of FIGS. 10A to 13. Note that unless otherwise specified, the subject of the flow chart is the touch panel print detailed setting application 3006. The touch panel print detailed setting application 3006 is loaded from the external memory 209 to the RAM 202 in response to the request of the other system and the user and performed in the CPU 201.

A description will be given of a color mode provisional UI generation processing with reference to the flow chart of FIG. 10A. The color mode provisional UI generation processing is started if the monochrome is set in the print ticket 3102 at the startup of the touch panel print detailed setting application 3006 (step S7001). Next, the acquisition of the cache data is performed and a color mode cache 10004 is acquired (step S7002). Next, it is determined whether or not the cache data can be acquired (step S7003).

If it fails to acquire the cache data (No), the color mode UI 9003 is created as the provisional UI and the processing ends (step S7005). In contrast, if the acquisition of cache data is successful (Yes), it is determined whether or not there are two or more options of the color mode function of the cache data (step S7004). If there are two or more options (Yes), the color mode UI 9003 is created and the processing ends (step S7005). In contrast, there is only one option, that is, there are not two or more options (No), the processing ends without displaying the color mode UI 9003.

Next, a description will be given of a double-side provisional UI generation processing with reference to the flow chart of FIG. 10B. The double-side provisional UI generation processing is started if the single-side is set in the double-side function of the print ticket 3102 at startup (step S7102). Next, the acquisition of the cache data is performed and a double-side function cache 10005 is acquired (step S7103). Then, it is determined whether or not the cache data can be acquired (step S7104). If the acquisition of the cache data fails (No), the double-side function UI 9004 is displayed as the provisional UI (step S7105). In contrast, if the acquisition of the cache data is successful (Yes), it is determined whether or not there are two or more options for the double-side function of the cache data (step S7105). If there are two or more options (Yes), the double-side function UI 9004 is created and the processing ends (step S7106). In contrast, if there is only one option, that is, there are not two or more options (No), the processing ends without displaying the double-side provisional UI.

Next, a description will be given of the sheet name provisional UI creation processing with reference to FIG. 11A. The sheet name provisional UI creation processing is started if the sheet name of the input sheet size and the output sheet size of the print ticket 3102 is not stored in the term database 30064 at startup (step S7201). Firstly, the acquisition of the cache data is performed, and a display name cache 10006 is acquired so that an Option name of the sheet thereof is acquired as a Key (step S7203). Next, it is determined whether or not the acquisition of the cache data can be performed (step S7204). If the acquisition of the cache data (No) fails, a provisional term registered in the term database 30064 is displayed on the input sheet size UI 9006 and the output sheet size UI 9005, and then the processing ends (step S7205). In contrast, if the acquisition of the cache data is successful (Yes), a Display Name within the cache data corresponding to the sheet is acquired and displayed (step S7206). Then, the processing ends.

Next, a description will be given of the stapling provisional UI creation processing with reference to FIG. 11B. Firstly, the processing is started (step S7301), and then the stapling information is initially read from the queue property bag 3013 (step S732). Next, it is determined whether or not the stapling function is set to ON (step S7303). If the stapling function is set to ON (Yes), a stapling UI 9007 is displayed and then the processing ends (step S7304). In contrast, if the stapling function is not set to ON (No), the processing ends without displaying the staple UI 9007.

Next, a description will be given of the acquisition of the cache data with reference to FIG. 12. Firstly, the processing is started (step S8001), and it is determined whether or not the cache data is present in the application data area 3030 (step S8002). If the cache data is not present (No), the background processing is performed and then the processing ends (step S8006). If the cache data is present (Yes), the cache data is acquired (step S8003).

Next, the driver version 10007 of the cache data (step S8004) is confirmed. That is, it is determined whether or not the driver version 10007 of the cache data is the same as the version of the printer driver. Here, the driver version 10007 is the version information of the printer driver when the cache data is created, and is stored together with the cache data. If the version of the printer driver is different from the driver version 10007 (No), the cache data is discarded (step S8005), the background processing is performed, and then the processing ends (step S8006).

In contrast, if the version of the printer driver is the same as the driver version 10007 (Yes), the application version 1008 of the cache data (step S8007) is confirmed. That is, it is determined whether or not the application version 1008 of the cache data is the same as the current version of the touch panel print detailed setting application 3006. Here, the application version 1008 is the version of the touch panel print detailed setting application 3006 when the cache data is created, and stores the version thereof together with the cache data. If the application version 1008 of the cache data is different from the current version of the touch panel print detailed setting application 3006 (No), the cache data is discarded (step S8005), the background processing is performed, and then the processing ends (step S8006). If the application version 1008 is the same as the current version of the touch panel print detailed setting application 3006 (Yes), the processing ends. Note that the discarding of the cache data may be the discarding of a part of the cache data or the discarding of all of the cache data.

Next, a description will be given of the background processing with reference to FIG. 13. Firstly, the processing is started (step S8101), and the cache data is created (step S8102). More specifically, the cache data is created from the version information of the driver of the print capability 3202 and the driver property bag 3020 and the version information of the touch panel print detailed setting application 3006. Note that the cache data created in step S8102 may be all or a part of the information about the print capability 3202. In the present embodiment, the driver version 10007 and the application version 1008 previously described are stored together with the cache data. It may be cached as different information by processing based on the print capability 3202.

Furthermore, if the driver property bag 302 holds information (a GPD file) for resolving a combination of invalid print settings and the like, the cache may be created by parsing the information relating to the print settings of the GPD file. In addition, Display Name of the print capability 3202 may be managed by creating the cache data for each national language because the Display Name is different for each language, such as English and Japanese. Note that the location in which the cache data is managed may be the application data area 3030.

After creating the cache data, it is determined whether or not there are two or more options of the color mode of the print capability 3202 (step S8103). If there is one option (No), that is, there are not two or more options, the color mode UI 9003 is hidden because it is not necessary to display the color mode UI 9003 (step S8104), and then the processing proceeds to step S8105. In contrast, if there are two or more options (Yes), the color mode UI 9003 remains displayed, and then the processing proceeds to step S8105.

Next, it is determined whether or not there are two or more options of the double-side function of the print capability 3202 (step S8105). If there is one option (No), that is, there are not two or more options, the double-side function UI 9004 is hidden (step S8106), and then the processing proceeds to step S8107. In contrast, if there are two or more options (Yes), the double-side function UI 9004 remains displayed, and then the processing proceeds to step S8107.

Next, it is determined whether or not the term of the input sheet size and the output sheet size, which are set in the print ticket 3102, is stored in in the term database 30064 (step S8107). If the term is stored in in the term database 30064 (Yes), the processing ends without doing anything. In contrast, if the term is not stored in in the term database 30064 (No), the Display Name of the print capability 3202 is displayed in the term of the sheet size corresponding to the input sheet size UI 9006 and the output sheet size UI 9005 (step S8108).

Note that in the present embodiment, if it is not uniquely determined whether there is one option or two or more options of the color mode UI 9003 and the double-side function UI 9004 when the top page is created by the print ticket 3102, the provisional UI is displayed. Then, if there is one option after creating the cache data, the provisional UI is hidden. That is, if the displayed provisional UI matches the UI to be displayed after creating the cache data, the provisional UI remains displayed, otherwise, if the displayed provisional UI is different from the UI to be displayed, the provisional UI is hidden. Furthermore, if it is not determined whether there is one option or two or more options of the color mode UI 9003 and the double-side function UI 9004 when the top page is created by the print ticket 3102, the provisional UI may be hidden, and then may be displayed after creating the cache data.

Next, a description will be given of the print capability 3202 and the print ticket 3102 with reference to FIGS. 14A and 14B. FIG. 14A is a diagram illustrating one example of the print capability 3202. The print capability 3202 is the list of the items of the function held by the printer driver, and is described in the XML. The list of the functions is described with the tag called a Feature 12001. In the present embodiment, "Page Media Size" is described as an example of the sheet size. The list of the items of each function is described with a tag called an Option 12002. In the present embodiment, "Letter", which is one of the sheet size, is described as an example of the Option 12002. One or more Feature 12001 and the Option 12002 are presented, respectively. A Display Name 12005, which is a term for easily displaying the Feature 12001 and the Option 12002, is not presented in the print ticket, but is presented in only the print capability 3202. Also, the content of the Display Name is changed to the term corresponding to each language according to the language set in the OS such as English or Japanese. In the present embodiment, the "Display name" of the Option 12002 is displayed.

FIG. 14B is a diagram illustrating one example of the print ticket 3102. The print ticket 3102 is the list of the selection items of the print settings and is described in the XML. The function and the item are described with the tag of a Feature 12003 and an Option 12004, as well as the print capability 3202. In the present embodiment, "Document Duplex", meaning the double-side function, is described as an example of the Feature 12003. Also, "One Side" is described, meaning the single-side function, which is the option, as an example of the Feature 12003.

Next, with reference to FIG. 15, a description will be given of the configuration of the cache data, which has an important position in the present embodiment. In the present embodiment, the cache data has the four elements of Locality, Container, Key, and Value. In the present embodiment, the processing proceeds by referring to four elements when the cache information is acquired in the above processing.

The Locality is the setting for determining the storage location of the cache information, and has three settings of Temporary, Local, and Roaming. The Temporary is a setting for temporary storing, is stored in the local PC, and deletes the information stored by the OS at any time. The information for the Local continues to be stored in the local PC. The Roaming replicates the information stored in the plurality of devices connected by the network 103. In this regard, the devices to be shared are limited when the determination performed on the network 103, which are accounts on the plurality of devices, are the same as each other using a personal authentication provided by Microsoft. Furthermore, the information is not deleted by the OS at any time. Note that in the present embodiment, Local 10000 is displayed on the Locality as an example.

Next, a description will be given of the Container. The Container is an aggregate of the Key and the Value which are managed for each group of data. The plurality of the Keys and the Values can be registered in one Container. Furthermore, the plurality of the Containers can be held at one Locality. Note that in the present embodiment, the Container of a Print 01 (10001) is displayed on the Container as an example.

The Key and Value are the elements indicating a storage destination and the stored information in the Container. The Key and Value arein a one-to-one relationship, and the information of the Value can be acquired by searching with the Key. Furthermore, the value of the Value is the information acquired when the cache is acquired. In the present embodiment, a Print Capabilities 10002 is displayed on the Key and a Print Capabilities 10003 is displayed on the Value, as an example. A Color 10004 is displayed as the color mode cache of the Value for determining whether it is the color machine or the monochrome machine. Furthermore, a Duplex 10005 is displayed as the double-side function cache of the Value for determining the double-side function. A Second Letter 10006 is displayed as a display name cache of the Value of the Display Name used when the sheet name is unknown. Note that the display cache sets the Display Name to the Value in which the name of the Option is set to the Key.

Furthermore, in the present embodiment, 5.0.0 is displayed as the driver version 10007 as an example. Note that, the driver version 10007 is the version information of the printer driver when the cache is created. In addition, in the present embodiment, 2.0.0 is displayed as the application version 10008 as an example. The application version 10008 is the version information of the touch panel print detailed setting application 3006 when the cache is created.

As described the above, according to the present embodiment, even if it is the UI with an uncertain display form by only the print ticket 3102, the UI can be displayed at a high speed, and a formal UI can be displayed during operation. Furthermore, the formal UI can be displayed from the beginning when activating again.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-230044, filed Nov. 25, 2015 which is hereby incorporated by reference wherein in its entirety.

The invention claimed is:

1. An information processing apparatus comprising:
at least one memory storing instructions; and
at least one processor configured to execute the stored instructions to:
   acquire a print ticket including information of a currently set output sheet size and thereafter a print capability including information of a sheet name corresponding to the output sheet size; and
   cause a display device to display:
      a first print setting screen, without including the sheet name, generated based on the print ticket; and thereafter a second print setting screen, including the sheet name, generated based on the print capability.

2. The information processing apparatus according to claim 1, wherein the first print setting screen includes provisional information corresponding to the sheet name.

3. The information processing apparatus according to claim 1, wherein the at least one processor is configured to execute the stored instructions to register the sheet name corresponding to the currently set output sheet size in a database based on the information of the acquired print capability.

4. An information processing apparatus comprising:
   at least one memory storing instructions; and
   at least one processor configured to execute the stored instructions to:
   acquire first data including information of a currently set sheet size and thereafter second data including information of a sheet name corresponding to the sheet size; and
   cause a display device to display:
      a first print setting screen, without including the sheet name, generated based on the information in the first data; and thereafter
      a second print setting screen, including the sheet name, generated based on the information in the second data.

5. A method of controlling an information processing apparatus, the method comprising:
   acquiring first data including information of a currently set sheet size and thereafter second data including information of a sheet name corresponding to the sheet size;
   causing a display device to display a first print setting screen, without generated based on the information in the first data; and thereafter
   causing the display device to display a second print setting screen, including the sheet name, based on the information in the second data.

\* \* \* \* \*